May 29, 1928.  1,671,360
H. C. FLETCHER
METHOD AND APPARATUS FOR MAKING CONTINUOUS METALLIC STRIPS
Original Filed March 10, 1924   2 Sheets-Sheet 1
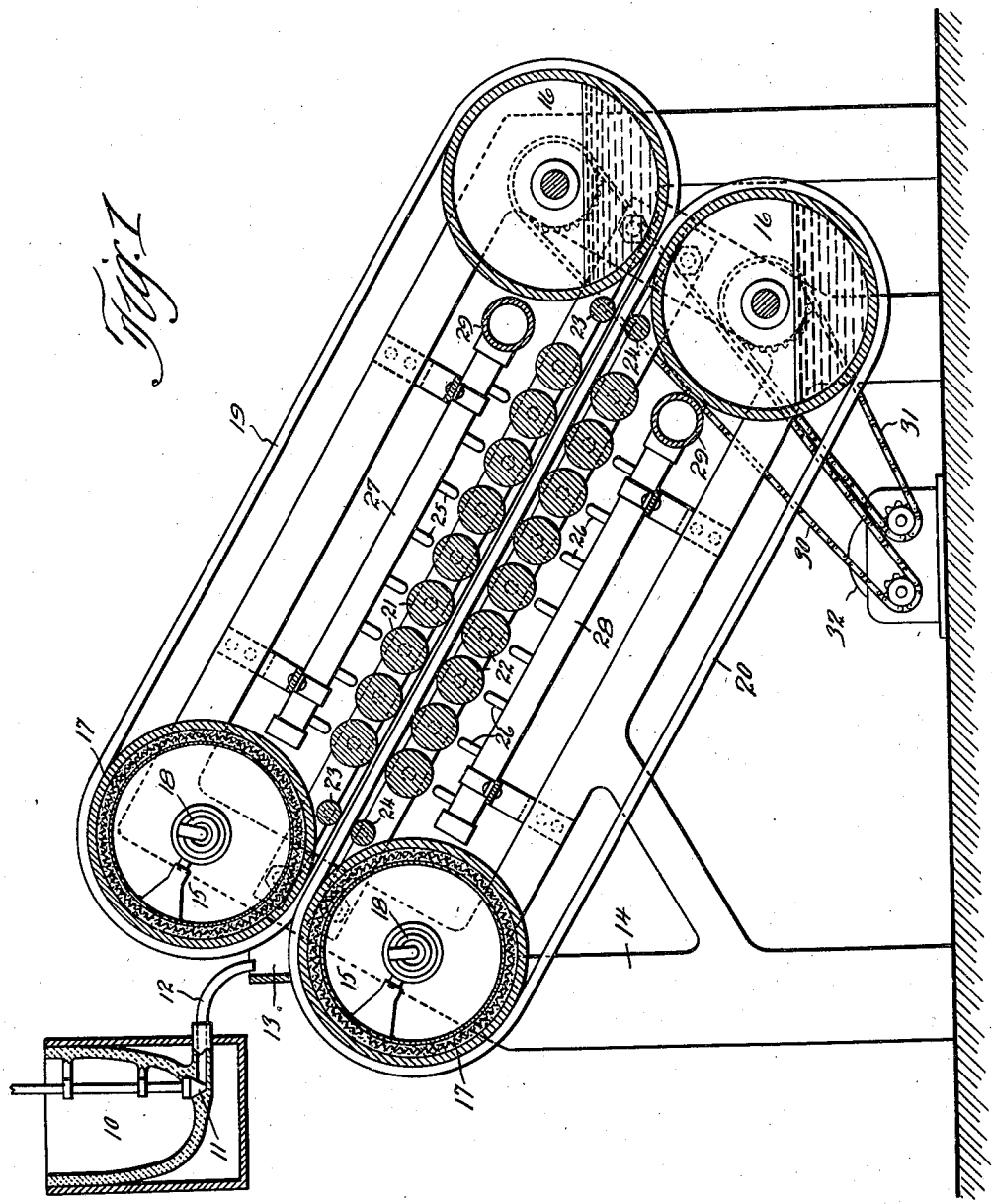
Inventor
H. C. Fletcher
By
Neill Brock & West
Attys.

May 29, 1928.  
H. C. FLETCHER  
1,671,360  
METHOD AND APPARATUS FOR MAKING CONTINUOUS METALLIC STRIPS  
Original Filed March 10, 1924   2 Sheets-Sheet 2
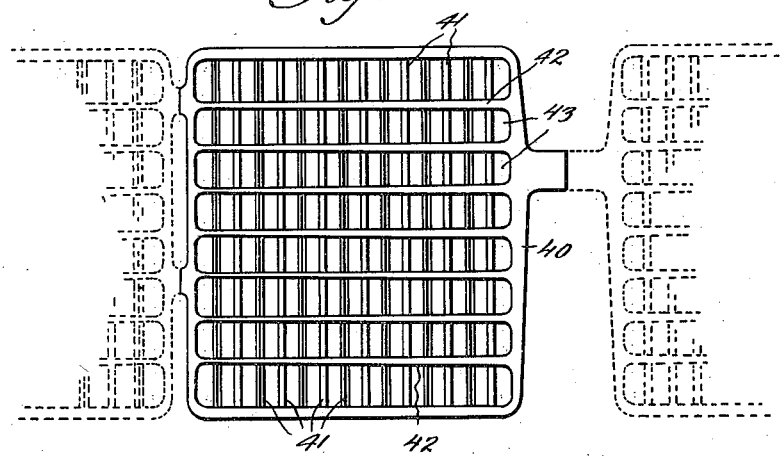
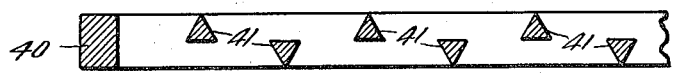
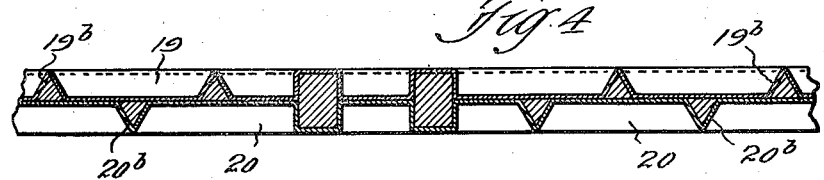
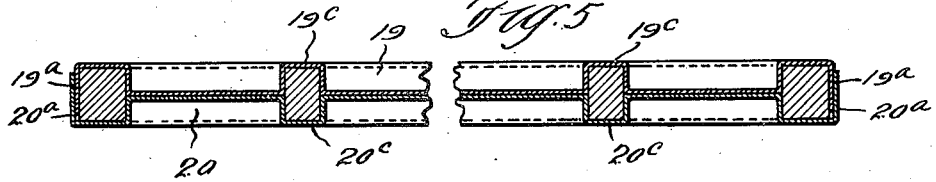
Inventor  
H.C Fletcher  
By  
Hull Brock & West  
Attys.

Patented May 29, 1928.

1,671,360

UNITED STATES PATENT OFFICE.

HOWARD C. FLETCHER, OF CLEVELAND, OHIO, ASSIGNOR TO MORRIS J. WOLF, OF CLEVELAND, OHIO.

METHOD AND APPARATUS FOR MAKING CONTINUOUS METALLIC STRIPS.

Application filed March 10, 1924, Serial No. 698,146. Renewed August 16, 1927.

This invention relates generally to the manufacture of a cast metal sheet in continuous or strip form and more particularly to an apparatus or a machine for making such continuous strip or sheet either in perforate or imperforate form.

The object of the invention is to provide a machine in which the molten metal either pure or alloy can be delivered to a mold or die at such a temperature that the entire space in the mold or die will be completely and properly filled; said die or mold being continuously movable whereby the molded or shaped strip is gradually cooled and finally discharged from the machine in a continuous strip form which may or may not be rolled as desired.

Another object of the invention is to provide a machine employing a continuously moving mold or die capable of producing either an imperforate strip or one having openings or perforations therein such as a battery grid.

Another object of the invention is to provide for the delivery of the metal to the mold or die at the proper temperature and also provide for the rapid cooling or chilling of the same whereby the crystalline structure of the sheet or strip can be regulated as desired.

Other objects of the invention will appear as the description proceeds.

The invention consists in the novel features of construction and arrangement, all of which will be fully described hereinafter and set forth in the appended claims.

In the drawings forming part of this specification, Fig. 1 is a sectional view of the machine embodying one form of my invention; Fig. 2 is a detail plan view of a series of battery grids formed or molded in a machine constructed in accordance with my invention; Fig. 3 is a detail cross sectional view of such grid; Fig. 4 is a detail longitudinal section of the upper and lower endless bands or strips constituting the traveling mold and Fig. 5 is a transverse sectional view of the same.

In carrying out my invention I employ any suitable construction of melting pot 10 controlled by a valve 11 and discharging the molten metal into the pipe or spout 12 by which it is delivered into a suitably arranged hopper or gate 13 supported at the upper end of a suitable main frame 14. This frame also supports the oppositely disposed upper drums 15 and the oppositely disposed lower drums 16, these drums being of any suitable width and also of such diameter as may be found advisable. The upper drums 15 are heating drums and these drums may be heated electrically or by gas or in any other suitable manner. In the present instance I have shown these drums provided on their interior with suitable electrical heating elements 17, the current being supplied through proper connections 18 in the center thereof. The lower roll 16 may be made hollow if desired and supplied with water as a cooling medium.

Traveling around the rolls 15 and 16 are the upper endless band 19 and the lower endless band 20, these bands being of suitable metal to withstand the high temperature and they are flanged at their outer edges as shown at 19$^a$ and 20$^a$, these flanges being so constructed as to permit the free and easy travel of the bands around the drums 15 and 16. The rolls 15 are so disposed with reference to the gate or hopper 13 and are of such size that the molten metal is delivered between the meeting places of the bands just as they pass around the drums 15 and start down their parallel flight. It is essential however that the drums 15 and those portions of the bands passing around the same at the rear, should be of substantially the same temperature as the molten metal so that there will be no tendency to chill the metal at this point and consequently the entire space of the mold or die will be completely filled with the molten metal of such temperature that it will flow freely into the same.

The rolls are adjustable toward and away from each other so that the parallel portions of the bands can be spaced apart any desired distance. I have not deemed it necessary to show any particular form of adjusting means as it will be understood that any suitable form of adjusting mechanism for adjusting the rolls toward or away from each can be employed.

As before stated, the bands are of thin flexible material and consequently pass freely around the drums and in the downward flight when the two bands are in close proximity to each other, a moving mold or die is provided and by having these bands flanged or otherwise provided with stops at the sides, the escape of metal at the sides is prevented.

In order to maintain the bands in proper parallel relation during the rolling or shaping operation, I provide a series of rolls 21 and 22 between which the bands pass, and it will be understood that these rolls are adjustable either simultaneously with the drums or independently thereof as preferred, and in addition to the series of rolls 21 and 22 I also provide additional rolls 23 and 24 adjacent the heating and cooling drums, these being somewhat smaller in order to place them close to both the heating and cooling drums in order to maintain the bands in true parallel relation at all times from the receiving of the metal to the discharge thereof.

In order to cool the metal as it passes along in the die or mold through the machine I provide air jet pipes 25 and 26 connected respectively to the manifolds 27 and 28 which in turn are connected to a suitable air supply pipe 29. By this arrangement jets of air are directed against the traveling mold or die both from above and below. Drive chains 30 and 31 are employed for moving the drums in the proper direction and at the proper speed, the drums in turn actuating the endless bands constituting the traveling mold or die and these in turn of course operate the heating drums 15. An electric motor 32 may be employed for driving the belts 30 and 31.

It will of course be understood that the shape and arrangement of the main frame and also the bearings and driving means may be varied or changed as desired without departing from the broad principle of my invention.

As previously stated, the bands 19 and 20 can be adjusted toward or away from each other to produce any desired thickness of strip or sheet metal and it will be understood that the molten metal flows into the gate or hopper 13 and then passes into the space between the bands and is carried along with the said bands to the lower end of the machine and is there discharged in a continuous or strip form thereby providing a thin strip or sheet of metal of the desired thickness and it should be noted that the initial shaping operation takes place at a time when the molten metal is in the proper state of fluidity due to the fact that the heating rolls 15 are maintained at such a temperature and likewise the adjacent portions of the endless bands so that all tendency of chilling the molten metal at its point of entrance is entirely obviated.

It is therefore possible to produce with this machine a continuous thin strip of metal which can be rolled upon a suitable drum and from which it can be reeled off as desired.

It will also be understood that this thin continuous strip of metal can be made either imperforate or perforate, this being accomplished by giving to the continuous bands the desired cross sectional shape and contour and in the present instance I have shown the manner of constructing and operating the machine for the purpose of producing a continuous and connected series of grids for storage batteries, it being well understood that such grids usually employ an outer frame portion and a series of properly arranged strips or cross pieces in order to provide the proper construction and arrangement of cavities or openings to receive the composition or paste which is applied to the grid in the course of manufacture.

In Fig. 2, I have shown one form of battery grid which can be made upon a machine such as I have described and consisting of the frame portion 40 and the connecting pieces 41 and 42 providing the openings 43. By reference to Fig. 3 it will be noted that the cross pieces 41 are staggered with respect to the horizontal central line and in order to provide for this the bands 19 and 20 are provided with the properly shaped and arranged corrugations 19$^b$ and 20$^b$. The cross members 42 are provided by arranging the corrugations 19$^c$ and 20$^c$, as most clearly shown in Fig. 5.

It will be noted by reference to Fig. 4 that the corrugation 19$^b$ is arranged opposite a flat portion of the band 20 and the corrugation 20$^b$ is arranged opposite the flat portion of the band 19 thus providing the staggered portions 41 in their proper relation.

It will be understood that I do not limit myself to the shapes shown in these figures as it is obvious that these shapes can be change or varied so long as the bands can be separated at the lower end and the molded strip discharged therefrom.

While I have shown the bands or strips punched or corrugated to provide the desired formation, it will be understood that the bands or strips can be otherwise formed in order to provide the desired shape of the die or mold. It will also be understood that two or more series can be arranged if so desired.

The length of the machine will of course be dependent upon the nature and character of the metal strips to be produced and the cooling operation can also be regulated for the same purpose if necessary.

Having thus described my invention, what I claim is:—

1. A machine of the kind described comprising a gate or hopper, heating drums arranged adjacent to said hopper, endless bands traveling around said heating drums and approaching each other at the hopper, said drums and bands at this point being heated to substantially the same degree as the molten metal contained within the hopper, said bands traveling in parallel relation a definite distance, and means for maintaining said bands in such position and means for moving the same in unison.

2. A machine of the kind described comprising upper and lower heating drums and upper and lower cooling drums and endless metallic bands travelling around the same, a gate or hopper arranged at the point where the endless bands approach each other, said bands and drums at these points being maintained at the same temperature as the molten metal within the gate or hopper, means for moving said bands and drums together with means for maintaining the bands in parallel relation between the heating and cooling drums.

3. A machine of the kind described comprising upper and lower heating drums and upper and lower cooling drums and endless metallic bands travelling around said drums together with means for moving said parts, means for heating the upper and lower heating drums, a gate or hopper arranged adjacent to the heating drums and bands at the point where said bands approach each other and adapted to deliver molten metal to the said bands at this point, said heating drums and bands being heated to substantially the same temperature as the molten metal, means for maintaining the bands in parallel fixed relation between the heating drums and the cooling drums and means for supplying a cooling medium to said bands during their passage between said heating and cooling drums.

4. A machine of the kind described comprising upper and lower heating drums together with means for heating the same during rotation, upper and lower cooling drums and means for adjusting said drums and metallic bands passing around said upper and lower drums, means for maintaining said bands in definite spaced parallel relation between the heating and cooling drums, a gate or hopper arranged at the juncture of the heating drums and bands and adapted to deliver molten metal between the bands at the point where they approach each other, said heating drums and bands being maintained at a temperature substantially the same as the molten metal in the gate or hopper, said bands being formed to provide a movable die or mold for shaping the molten metal fed between the same.

5. In a device of the kind described the combination with a gate or hopper, of a pair of heating drums arranged adjacent thereto, heating means carried by said drums and adapted to maintain said drums at substantially the same temperature as the molten metal contained in the gate or hopper, and endless shaping dies travelling around said drums and approaching each other at the discharge end of the hopper or gate and whereby the molten metal is delivered to the said movable die at the proper temperature for completely filling the entire die.

In testimony whereof, I hereunto affix my signature.

HOWARD C. FLETCHER.